Patented Oct. 2, 1928.

1,685,883

UNITED STATES PATENT OFFICE.

ARTHUR B. RAY, OF FLUSHING, NEW YORK, ASSIGNOR TO CARBIDE AND CARBON CHEMICALS CORPORATION, A CORPORATION OF NEW YORK.

PROCESS OF SEPARATING GAS MIXTURES.

No Drawing. Application filed May 4, 1923. Serial No. 636,766.

The invention is a process of separating gas mixtures by the selective absorption of one or more constituents in activated carbon. In the foregoing statement, certain terms are used in a broad sense, "gas" comprehending all aeriform substances including those existing under such conditions that they are often referred to as vapors; and "absorption" including the effect sometimes termed adsorption.

The invention is applicable to gas mixtures in general. Among the constituents which may be present are hydrocarbons of various degrees of volatilty, air, water, alcohols, ketones, aldehydes, ethers and volatile esters. Specific applications are the recovery of volatile solvents which have evaporated, and the extraction of gasolene from natural gas.

Prior to my invention, it has been believed that activated carbon, to be an effective absorbent, must be substantially free from water, as is the case with other solid absorbents. Thus United States Patent 1,420,613, issued June 20, 1922 to Voress and Cantor, describes and claims a process wherein activated carbon, which has been wetted in a previous operation, is treated by contacting it with denuded natural gas, in order to dry the carbon and put it into condition to absorb another portion of material. The patented process is described as an improvement over a prior process in which drying was effected with superheated steam, and in both cases the drying is indicated to be essential.

I have found that activated carbon is an effective gas absorbent of general application regardless of its water-content, and upon this discovery I have based a process having marked advantages over those which employ a special drying operation, or in which the water-content of the carbon always remains low.

As applied to gasolene manufacture, my invention comprises bringing natural gas into contact with activated carbon under temperatures and pressure conditions similar to those now used. It will be understood that increasing the pressure and decreasing the temperature favor absorption. The absorption of gases liberates heat which increases the temperature of the absorbent and thereby interferes with the operation. In accordance with my invenion, a new method of removing heat from the absorbent during the absorption, or preliminarily to the absorption, becomes available, viz a method comprising flowing water in direct contact with the carbon.

When the carbon is saturated to the desired extent with gasolene or other substance to be recovered, the absorbed material, or a part of it, may be expelled in any suitable way. Expulsion of the absorbed material is usually effected by increasing the temperature of the absorbent, with or without a simultaneous reduction of pressure. I may heat by the use of superheated steam, saturated steam, or hot water, and any of these media may be brought into direct contact with the carbon. If superheated or saturated steam is used, it can be cut off as soon as the desired proportion of the absorbed material is expelled, leaving any water resulting from condensation and retained by the carbon in the latter.

It is usually preferable to cool the absorbent artificially after the operation last described in order more quickly to prepare it for a subsequent absorption. This cooling may be brought about in any suitable way, and no provision for the romoval of water from the carbon is necessary. In fact, a simple, rapid, and advantageous method of cooling the carbon consists in flowing cold water in contact with it for a sufficient time. The cooled absorbent, even though fully saturated with water, is then used to separate a fresh portion of gas. The water remaining in the carbon is advantageous in the respect that its evaporation absorbs a part at least of the heat which is liberated by the absorption of the gasolene material, thus acting to prevent undue rise in the temperature of the carbon during absorption.

My process give excellent results, and in many instances the best results, when the carbon used in the absorption step is substantially saturated with water. It may be visibly wet and in some cases should be. However, I do not restrict myself to the use of water-saturated carbon. In many cases spontaneous evaporation, due for instance to incidental heating, or evaporation due to other steps not specially designed for drying the carbon, may reduce its water-content to a point below saturation. In other cases, operations performed on the carbon, such as those involving contact of steam or water therewith, do not saturate the carbon with water but nevertheless increase its water-content to a point which in the prior art would have been regarded as altogether undesirable. The use, as an absorbent, of carbon of such water-content as those just referred to, is within my invention.

As already noted, water absorbed in the carbon acts with positive advantage in some respects, particularly by the cooling action which it exerts upon being vaporized and replaced by other matter. For this reason, I prefer in many cases to use for absorption carbon in which the water-content is above a certain minimum, say about 30% of the weight of the dry carbon.

It will be understood that the steps described herein may be modified, or may be used in conjunction with any other steps adapted for similar purposes or adapted to improve the process in any other way. Thus, the absorbent may have a low water-content after the explusion of the absorbed material, as when the explusion is effected by prolonged steaming with superheated steam, or by indirect heating, the heating medium being confined in jackets, coils or the like, and out of contact with the absorbent. If the absorbent is then cooled by direct contact with water, or has its water-content increased in any other way, and the absorbent is used for the separation of a fresh portion of gas mixture without a special intervening drying, this is within my invention. My invention is not restricted to direct water cooling during absorption. Cooling at this stage may be so carried out that the carbon does not have its water-content increased, or artificial cooling may not be used.

The essence of my invention is the use of activated carbon containing proportions of water heretofore regarded as undesirable, as an absorbent for gases not chemically reactive with water under the conditions of the absorption, and it is my intention to cover this step in all the relations included in the appended claims.

I claim:

1. Process of separating gasolene from natural gas by absorption in activated carbon which comprises treating the gas with the carbon under suitable conditions to absorb gasolene constitutents in the carbon; expelling at least a part of the absorbed material and reconditioning the carbon for use as an absorbent by steps which leave the carbon substantially saturated with water; and then treating a further quantity of natural gas from which no gasolene has been removed with the water-saturated carbon.

2. In the process of separating gasolene from natural gas by absorption in activated carbon, the step of absorbing gasolene constituents from the gas in water-saturated activated carbon.

3. Process according to claim 1 in which the carbon is cooled by direct contact with water.

4. Process according to claim 1 in which the expulsion of gasolene constituents is effected by direct contact of the carbon with hot water.

5. Process of separating gases by absorption in activated carbon, which comprises treating the gas mixture with the carbon and supplying water to the carbon during the absorption to cool the carbon.

6. Process of separting gasolene from natural gas by absorption in activated carbon which comprises treating the gas with the carbon and supplying water to the carbon during the absorption to cool the carbon.

7. In the process of separating gasolene from natural gas by absorption in activated carbon, the step of absorbing gasolene constituents from the gas in activated carbon containing water in amount upward of about 30% of the weight of the dry carbon.

8. Process of separating gases by absorption in activated carbon which comprises treating a gas mixture with the carbon under suitable conditions to absorb a portion of the mixture in the carbon; expelling absorbed material from the carbon by the application of heat; cooling the carbon by direct contact with water, leaving the carbon substantially water-saturated; and then treating a gas mixture with the water-saturated carbon.

9. Process of treating a gas mixture for the recovery of a water-insoluble constituent thereof which comprises bringing the gas mixture into contact with activated carbon to absorb said water-insoluble constituent in the carbon; surrounding the grains of carbon with hot water to volatilize the adsorbed constituent; and bringing the carbon in a substantially water-soaked condition into contact with a fresh portion of said gas mixture to absorb more of said water-insoluble constituent.

10. Process of treating a gas mixture for the recovery of a water-insoluble constituent thereof which comprises bringing the gas mixture into contact with activated carbon to absorb said water-insoluble constituent in the carbon; volatilizing the absorbed material by the application of heat; cooling the carbon by direct contact with water, leaving the carbon substantially water-soaked; and then treating a fresh portion of the gas mixture with the water-soaked carbon to absorb more of said water-insoluble constituent.

11. Process of separating gas mixtures by the absorption of a water-insoluble constituent thereof in activated carbon which comprises contacting the gas mixture with the carbon and supplying water to the carbon during the absorption to cool the carbon.

12. In a process of separating gas mixtures by the absorption of a water-insoluble constituent thereof, the step of absorbing said water-insoluble constituent in activated carbon containing water in amount upward of about 30% of the weight of the dry carbon.

In testimony whereof, I affix my signature.

ARTHUR B. RAY.